(12) United States Patent
Bosanquet et al.

(10) Patent No.: US 11,222,294 B2
(45) Date of Patent: Jan. 11, 2022

(54) SYSTEMS AND METHODS FOR RISK MANAGEMENT IN A GEOGRAPHICALLY DISTRIBUTED TRADING SYSTEM

(71) Applicant: FIDESSA TRADING UK LIMITED, London (GB)

(72) Inventors: Devin Bosanquet, London (GB); Taylor Brunson, New York, NY (US); Stewart Fenton, Surrey (GB); Lee Muraleedharan, Middlesex (GB)

(73) Assignee: FIDESSA TRADING UK LIMITED, London (GB)

( * ) Notice: Subject to any disclaimer, the term of this patent is extended or adjusted under 35 U.S.C. 154(b) by 0 days.

(21) Appl. No.: 16/853,679

(22) Filed: Apr. 20, 2020

(65) Prior Publication Data

US 2020/0250598 A1 Aug. 6, 2020

Related U.S. Application Data

(63) Continuation of application No. 15/587,607, filed on May 5, 2017, now Pat. No. 10,628,768.

(60) Provisional application No. 62/333,395, filed on May 9, 2016.

(51) Int. Cl.
*G06Q 10/06* (2012.01)
*G06Q 30/02* (2012.01)
*G06Q 40/04* (2012.01)

(52) U.S. Cl.
CPC ..... *G06Q 10/0635* (2013.01); *G06Q 30/0216* (2013.01); *G06Q 40/04* (2013.01)

(58) Field of Classification Search
None
See application file for complete search history.

(56) References Cited

U.S. PATENT DOCUMENTS

| 6,983,259 | B1 |   | 1/2006  | Foray et al. |           |
|-----------|----|---|---------|--------------|-----------|
| 7,933,830 | B1 | * | 4/2011  | Buck         | G06Q 40/06 |
|           |    |   |         |              | 705/37    |
| 8,583,534 | B1 | * | 11/2013 | Slezak       | G06Q 40/06 |
|           |    |   |         |              | 705/37    |
| 10,628,768| B2 | * | 4/2020  | Bosanquet    | G06Q 40/04 |

(Continued)

OTHER PUBLICATIONS

U.S. Appl. No. 15/587,607 (U.S. Pat. No. 10,628,768), filed May 5, 2017 (Apr. 21, 2020).

(Continued)

*Primary Examiner* — Sujay Koneru
(74) *Attorney, Agent, or Firm* — Baker Botts L.L.P.

(57) ABSTRACT

A computerized trading system includes a master node and a plurality of regional nodes, the master and regional nodes each including a processor and memory, and where the master node is communicatively coupled to each of the regional nodes over a network. The master node and regional nodes are programmed to perform a method for updating limits for each of the regional nodes, where the master node maintains a global limit and a ratio representing a proportion of the global limit allocable to each of the regional nodes. The master node allocates to each regional node a local limit that is a proportion of the global limit in accordance with the ratio, and monitors the local limit utilization at each of the regional nodes. When the master node detects one or more events, the master node allocates a new local limit to one or more of the regional nodes.

17 Claims, 5 Drawing Sheets

(56) References Cited

U.S. PATENT DOCUMENTS

| | | | |
|---|---|---|---|
| 2002/0087455 A1* | 7/2002 | Tsagarakis | G06Q 30/06 705/37 |
| 2002/0091624 A1 | 7/2002 | Glodjo et al. | |
| 2002/0128958 A1 | 9/2002 | Slone | |
| 2002/0133455 A1* | 9/2002 | Howorka | G06Q 20/40 705/37 |
| 2004/0186806 A1* | 9/2004 | Sinclair | G06Q 30/0601 705/37 |
| 2005/0102217 A1 | 5/2005 | Burns et al. | |
| 2006/0010065 A1* | 1/2006 | Howorka | G06Q 40/06 705/37 |
| 2006/0015441 A1* | 1/2006 | Burkhardt | G06Q 40/06 705/37 |
| 2007/0156568 A1 | 7/2007 | Jovanovic | |
| 2008/0008094 A1 | 1/2008 | Gilfix | |
| 2009/0132409 A1 | 5/2009 | Lutnick et al. | |
| 2009/0210354 A1* | 8/2009 | Beddis | G06Q 40/025 705/36 R |
| 2009/0271325 A1* | 10/2009 | Wilson | G06Q 40/06 705/36 R |
| 2012/0179592 A1* | 7/2012 | Sheldon | G06Q 40/04 705/37 |
| 2012/0254012 A1 | 10/2012 | Studnitzer et al. | |
| 2013/0282549 A1 | 10/2013 | Howorka | |
| 2014/0330700 A1* | 11/2014 | Studnitzer | G06Q 40/04 705/37 |

OTHER PUBLICATIONS

U.S. Appl. No. 15/587,607, filed Mar. 16, 2020 Issue Fee Payment.
U.S. Appl. No. 15/587,607, filed Dec. 18, 2019 Notice of Allowance.
U.S. Appl. No. 15/587,607, filed Sep. 30, 2019 Amendment with Request for Continued Examination.
U.S. Appl. No. 15/587,607, filed Sep. 12, 2019 Advisory Action.
U.S. Appl. No. 15/587,607, filed Aug. 29, 2019 Response to Final Office Action.
U.S. Appl. No. 15/587,607, filed Aug. 6, 2019 Final Office Action.
U.S. Appl. No. 15/587,607, filed Jul. 23, 2019 Response to Non-Final Office Action.
U.S. Appl. No. 15/587,607, filed Apr. 25, 2019 Non-Final Office Action.
"Optimizing the Global Trade Management Solution Evaluation, Selection Process" by Cognizant (2011) (retrieved from https://www.cognizant.com/industries-resources/transportation_and_logistics/Optimizing-the-Global-Trade-Management-Solution-Evaluation-Selection-Process.pdf) (Year: 2011).

* cited by examiner

SYSTEMS AND METHODS FOR RISK MANAGEMENT IN A GEOGRAPHICALLY DISTRIBUTED TRADING SYSTEM

CROSS REFERENCE TO RELATED APPLICATIONS

This application is a continuation of U.S. patent application Ser. No. 15/587,607, filed on May 5, 2017, which claims benefit of U.S. Provisional Patent Application No. 62/333,395, entitled "Systems and Methods for Risk Management in a Geographically Distributed Trading System," which was filed on May 9, 2016, the entirety of both of which is herein incorporated by reference.

BACKGROUND

Brokers often provide clients access to financial markets. Clients or traders enter orders into trading systems provided by brokers, and these orders are electronically sent to an exchange for execution. Orders can be entered in a variety of ways. For example, the client can call the broker over the phone, and the broker can enter the order himself into the trading system. The client can also send the order electronically to the broker. In either case, the broker takes responsibility for executing the order within the price limits specified by the client. This can be a single execution, or the order can be worked over a period of time and filled by a number of executions on the exchange. This is referred to as Care order flow.

Alternatively, the client can send an order to be worked by an algorithm provided by the broker. The algorithm is implemented within the trading system of the broker, and is referred to as an Algo, of which many types exist. An Algo takes in an order and determines how the order is to be executed on the exchange, by using predefined logic, input parameters, and live market data. The order can be entered electronically or manually by the broker into the Algo. This is referred to as Algo order flow.

The client or trader can also send an order directly to the exchange, without intervention by a broker or Algo. The order can be entered via a screen provided by a broker or electronically into the trading system, which in turn routes the order to the exchange. This is referred to as Direct Market Access ("DMA") order flow.

Global broker trading systems have been developed that provide clients and traders access to global markets such as those located in the United States, Europe, and Asia. Usually the global trading system comprises an architecture of regional nodes that are located close to exchanges for latency reasons. The regional nodes are separate systems (typically located in separate data centers) that act and operate independently. The global system accepts orders from clients and traders (electronically or via a screen) for any exchange, where the underlying architecture is transparent to the user. A client or trader can be located in London, and can enter orders for the CME exchange (in the US) or Eurex (in Germany); from the user's perspective the experience is the same and it would not be apparent to the user that orders have been sent to different regional nodes located in data centers thousands of miles apart. To a client or a trader there is a single access point to the global system, and the system routes orders to the relevant regional nodes where they are sent to the relevant exchanges for execution.

Brokers typically subject their clients to pre-trade risk controls. These controls aim to minimize errors, for example mistyping and repeated orders, but also aim to minimize credit risk for clients. The types of checks include: maximum order size; value and price limits; daily value and position limits for the client or trader; and daily margin limits for clients.

Margin is the amount of cash or collateral required by an exchange clearing house for clients or brokers to enter into a listed derivatives position. Margin limits involve brokers calculating the margin requirements for listed Futures and Options ("F&O") orders and positions, and ensuring a client has enough cash or collateral to cover the margin requirements for all new orders entered. Many trading systems will perform margin checks using the exchange clearing house methodology or some approximation thereof.

Daily value limits and margin limits are usually set per client or client account regardless of what financial instruments are traded by the client. For F&O trading systems, margin can be calculated for all instruments across all exchanges and aggregated to a single requirement, validated against a single limit.

It is desirable that global trading platforms comprising regional nodes be able to validate an order pre-trade and ensure its contribution to a client's position will not exceed the global limit specified for a particular client. Conventional techniques to achieve this end include (i) using a single entry point; or (ii) using a replication scheme.

Use of a single entry point includes validating all orders for a particular client against a single total and limit maintained in one location. After validation the order is routed to the relevant node for execution. However, in a multi-node system, it can be difficult to find a suitable location for the single entry point if clients are trading multiple markets. That is, for example, use of a single entry point can result in a significant latency cost as the system performing the risk checks may be located many thousands of miles from both the client and the destination exchange.

Use of a replication scheme includes replicating the limit and totals on each regional node, and validating orders at each node. However, this can result in so called "in-flight" risk, where two or more orders entered by a client in quick succession to markets located in different regions can result in the client breaching their limit, since each node has yet to be updated by the respective orders in the other nodes due to the latency of replication.

Accordingly, improved techniques for risk management in a geographically distributed trading system are desired.

SUMMARY OF THE INVENTION

The presently disclosed subject matter provides techniques for order management and routing in a global trading system, including techniques for risk management among a plurality of trading nodes. In particular, the disclosed subject matter relates to techniques for managing global limits in a global trading platform that improves latency and prevents erroneous limit breaches, as described below. As used herein, the limit can be any kind of aggregate limit, such as margin or consideration.

In one aspect of the disclosed subject matter, one of the regional nodes in a global trading system can be designated the master node. The master node can receive the client limits and divide and distribute the limit ("splitting") across the various regional nodes. In this way validation can occur regionally instead of centrally, retaining latency benefits. Additionally, as embodied herein and unlike the replication approach there is no possibility of in-flight risk.

The master node can split the limit across the various nodes using a parameter called the Split Ratio. The parameter can be defaulted such that the limit is split equally across each node. In certain embodiments, the parameter can be altered manually per client so that a greater proportion of the limit is allocated to a particular node, where the majority of trading may occur for that client.

The master node can be configured to continuously monitoring the usage of the client limit in each regional node, in real-time without user intervention. If and when a particular node begins to disproportionately consume its available limit, compared to other nodes, the master node can rebalance the available limit across the nodes. The master node can attempt to keep the available limit on each node in the same proportion as the Split Ratio, by borrowing availability from low utilization nodes and granting to high utilization nodes. Any adjustments to the Split Ratio can also result in a rebalance. This process can be controlled and tuned such that rebalancing occurs at a frequency that ensures maximizing limit usage while reducing the overhead of excessive updates where acquiring and granting will provide marginal benefit.

According to one or more embodiments, a computerized trading system is provided, whereby the system comprises a master node and a plurality of regional nodes, the master and regional nodes each including a processor and memory, where the master node is communicatively coupled to each of the regional nodes over a network. The master node and regional nodes are programmed to perform a method for updating limits for each of the regional nodes, whereby the method comprises maintaining, at the master node, a global limit and a ratio representing different proportions of the global limit allocable to each of the regional nodes. The global limit can be associated with a client account and set by the client. The ratio representing the different proportions of the global limit allocable to each of the regional nodes can be predetermined. The method further comprises allocating, by the master node to each regional node, a local limit that is a proportion of the global limit in accordance with the ratio and monitoring, by the master node, local limit utilization at each of the regional nodes. The method further comprises detecting, by the master node, one or more events and, responsive to the detection, allocating a new local limit to one or more of the regional node.

Further embodiments include a non-transitory computer-readable medium that stores instructions that, when executed by one or more processors included in a master node and a plurality of regional nodes, cause the one or more processors to carry out the above method.

Throughout the drawings, the same reference numerals and characters, unless otherwise stated, are used to denote like features, elements, components or portions of the illustrated embodiments. Moreover, while the disclosed subject matter will now be described in detail with reference to the figures, it is done so in connection with the illustrative embodiments.

DETAILED DESCRIPTION

Exemplary embodiments of the disclosed subject matter are described below, with reference to the figures, for purposes of illustration, and not limitation. It should be apparent, however, to those skilled in the art that many more modifications besides those described herein are possible without departing from the concepts of the disclosed subject matter.

In one aspect of the disclosed subject matter, a trading system can include a plurality of trading nodes in a plurality of geographic locations. Each geographic location can include a particular market or exchange. Each trading node can interface with a switching layer which can route requests associated with each of the exchanges to one or more nodes. Each node can also include an Execution Management System (EMS) which can be configured to perform pre-trade risk checks. The system can be configured such that a client account can have or be associated with a global margin limit. The system can dynamically split the client account's global margin limit across the trading nodes based on a predetermined split ratio. The predetermined split ratio can be based on a client and/or client account, and/or set by one or more of the client, trader, broker, or any other involved user or actor. The system can then automatically monitor and dynamically adjust the margin limit at each node. In this manner, the system can ensure that the global margin limit will not be breached while minimizing false positive order rejections without the need for manual intervention, while maintaining low latency. The global limit can be set by the client, trader, broker, or any other involved user or actor.

Figure 1:
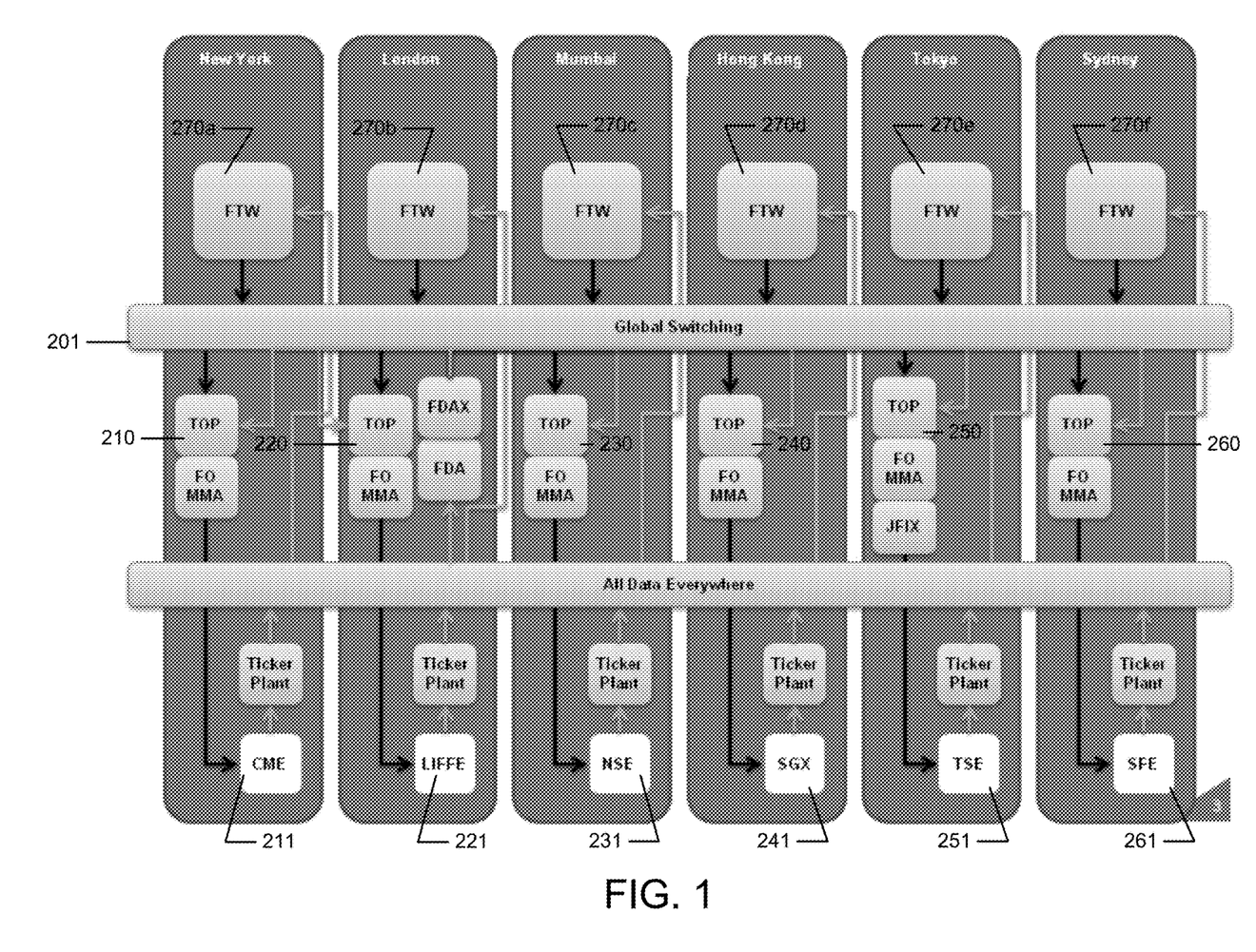
FIG. 1 is a schematic diagram illustrating a representative geographical deployment of a global trading system in accordance with an embodiment of the disclosed subject matter.

In an exemplary embodiment, with reference to FIG. 1, a global trading system in accordance with the disclosed subject matter can include trading nodes in a plurality of geographic locations. Each geographic location can include a particular market or exchange. For example, trading node 210 can be located in New York (and associated with the Chicago Mercantile Exchanges, or CME 211), trading node 220 can be located in London (and associated with the London International Financial Futures and Options Exchange, or LIFFE 221), trading node 230 can be located in Mumbai (and associated with the National Stock Exchange of India, or NSE 231), trading node 240 can be located in Hong Kong (and associated with the Singapore Exchange, or SGX 241), trading node 250 can be located in Tokyo (and associated with the Tokyo Stock Exchange, or TSE 251), and trading node 260 can be located in Sydney (and associated with the Sydney Futures Exchange, or SFE 261). One of skill in the art will appreciate that although trading node 210 associated with CME 211 is depicted in FIG. 1 as located in New York, such a trading node could also be located in another geographic region, such as Chicago, for example, where lower latency is desired. Additionally, one of skill in the art will appreciate that the locations and exchanges depicted in FIG. 1 are exemplary, and that a variety of other locations and markets/exchanges may be used. Each trading node can interface with a global switching layer 201 which routes requests associated with each of the exchanges to one or more other nodes. As shown in FIG. 1, each trading node can be configured to interface with one or more end user applications (270a through 270f) adapted for receiving input from a user. The global switching layer 201 can be configured to cause each end user application to display an entry dialog corresponding to the trading node on which the user's order will be processed.

Each trading node can include an Order Management System (OMS) and an Execution Management System (EMS). The OMS can be adapted to receive and manage orders from a user's account. For example, the OMS can be configured to receive manual orders from a client and/or receive algorithmic orders from a client, create one or more child orders according to parameters received from the client, and forward the child orders to the EMS.

The EMS can be configured to perform pre-trade risk checks as described herein and to transmit orders for execution on the exchange associated with the trading node. For example, the EMS can transmit child orders received from the OMS for execution if risk checks are successful. In one embodiment, the EMS can transmit orders for execution only if a client account's margin limit for the trading node is not breached. Additionally, or alternatively, the EMS can be configured to receive orders directly from a client in a case where the client has a direct market access (DMA) arrangement. In this case, the EMS can also be configured to perform pre-trade risk checks and transmit the order if the client account's margin limit for the trading node is not breached.

As embodied herein, and in accordance with an exemplary embodiment of the disclosed subject matter, a client account can have a global margin limit. This margin limit can be, for example, a Net Liquidity Value. Additionally or alternatively, the limit could also be any kind of aggregate limit, including a consideration limit.

Figure 2:
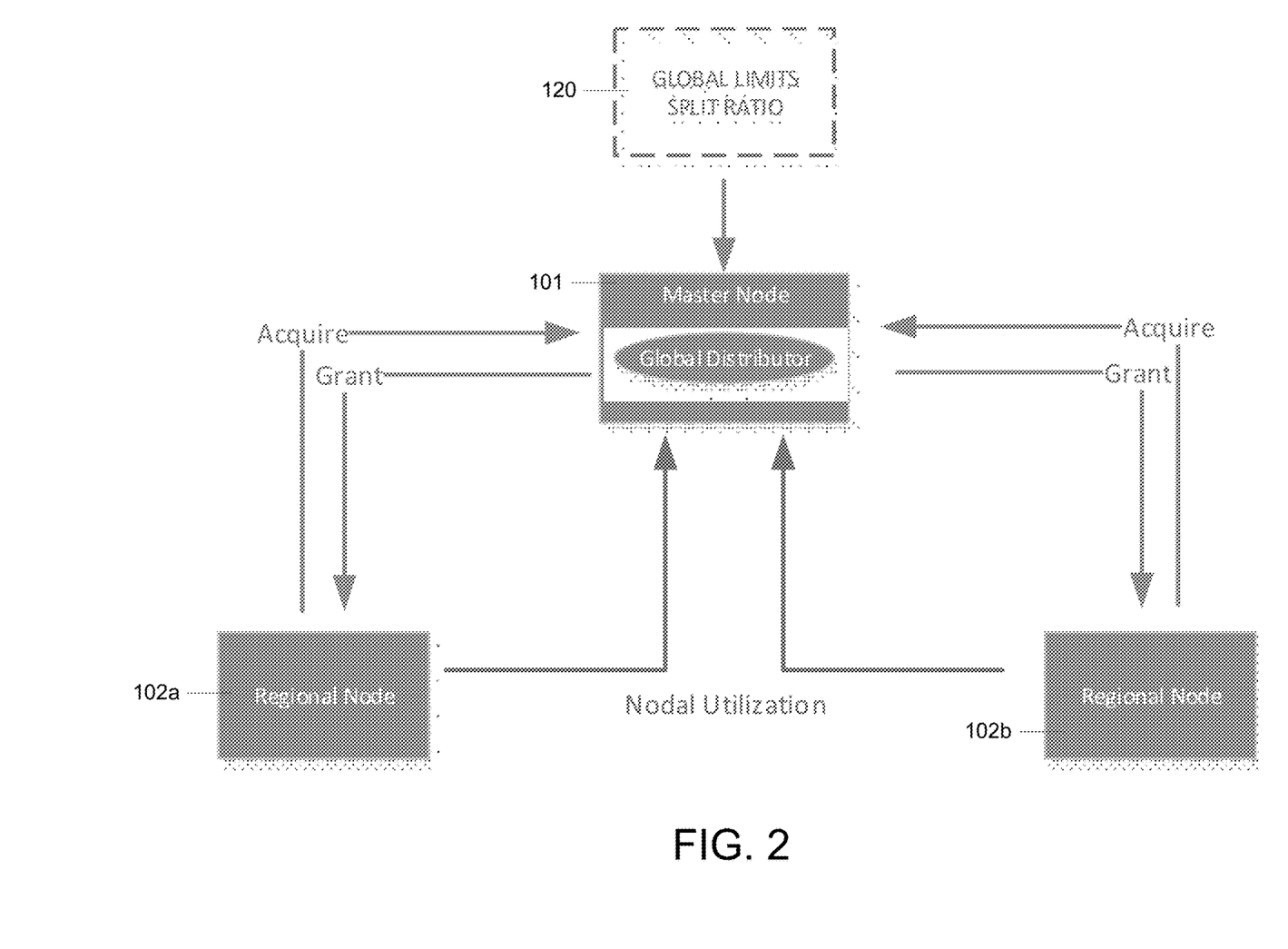
FIG. 2 is a schematic diagram illustrating the components of an exemplary trading system in accordance with an exemplary embodiment of the disclosed subject matter.

In accordance with an exemplary embodiment, and with reference to FIG. 2, the client account's global margin limit can be split across two or more of the trading nodes in the system. For example, the system can be configured such that the client or broker, e.g., using a graphical user interface, can specify an initial split ratio indicating the percentage of the client's global margin limit that should be initially allocated to each node. For purpose of illustration, and not limitation, this value will be referred to herein as the initial local margin limit. It will be appreciated that, although description is made herein with reference to the client account's global margin limit, the limit could also be any kind of aggregate limit, including a consideration limit.

The EMS of each trading node (102a, 102b) can be configured to enforce pre-trade risk checks on a client account's local margin limit. One of the regional nodes in a global trading system can be designated the master node, depicted in FIG. 2 as master node 101. Master node 101 can receive client limits and divide and distribute the limit (referred to as "splitting" the limit) across various regional nodes. In this way validation can occur regionally instead of centrally, retaining latency benefits, without incurring in-flight risk.

The master node can split the limit across the various nodes using a parameter called the Split Ratio, which is depicted as Split Ratio 120 in FIG. 2. This parameter can be defaulted such that the limit is split equally across each node. In certain embodiments, Split Ratio 120 can be altered manually by an end user so that a greater proportion of the limit is allocated to a particular node, where the majority of trading may occur for that end user.

Master node 101 can continuously monitor the usage of the client limit in each regional node (102a, 102b), in real-time without user intervention. If and when a particular node begins to disproportionately consume its available limit, compared to other nodes, master node 101 can rebalance the available limit across regional nodes 102a and 102b. Master node 101 can attempt to keep the available limit on each node in the same proportion as the Split Ratio by borrowing availability from low utilization nodes and granting to high utilization nodes. Any adjustments to the Split Ratio can also result in a rebalance. This process can be controlled and tuned such that rebalancing occurs at a frequency that ensures maximizing limit usage while reducing the overhead of excessive updates where acquiring and granting will provide marginal benefit.

In this manner, a trading system in accordance with the disclosed subject matter can ensure that the account's global margin limit will not be breached while minimizing false positive rejections, and can allow for trading in globally distributed systems where trading systems are spread out over large geographical areas, while maintaining low latency without impacting trading platform functionality.

In accordance with one aspect of the disclosed subject matter, the EMS of each trading node is also configured to dynamically adjust the local margin limit. As noted above, master node 101 can monitor limit utilization on all regional nodes. If a particular regional node is deemed underutilized relative to other nodes, i.e., a regional node has a greater proportion of limit availability than other nodes according to the split ratio, the node's local limit can be reduced. As used herein, for purpose of explanation and not limitation, this is referred to as the "acquire phase." Master node 101 can monitor how much of a limit is not granted (i.e., the difference between the global limit and each local limit) and increase local limits according to local limit utilization. The acquire and grant phases, described in further detail herein below, can run independently and continuously.

In connection with an exemplary embodiment, the acquire phase can refer to a set of operations that calculate how much a given global limit should be distributed to each regional node. The acquire phase can lower a regional limit for the nodes which are determined to be underutilized. In certain embodiments, this phase can have a configurable "cooling off" period during which no acquires can be issued in response to limit parameter updates.

In accordance with an exemplary embodiment, the grant phase can refer to a set of operations that calculate how much a given global limit should be distributed to each regional node and how much is currently not granted. The non-granted portion can be the difference between the global limit parameter value and a sum of parameter values downloaded from regional nodes. This phase can then issue one or more parameter updates which will aim to distribute the non-granted portion of the global limit to all nodes so as to bring the nodal limit parameter utilization into balance in accordance with each regional node's value of the Split Ratio parameter.

Figure 3:
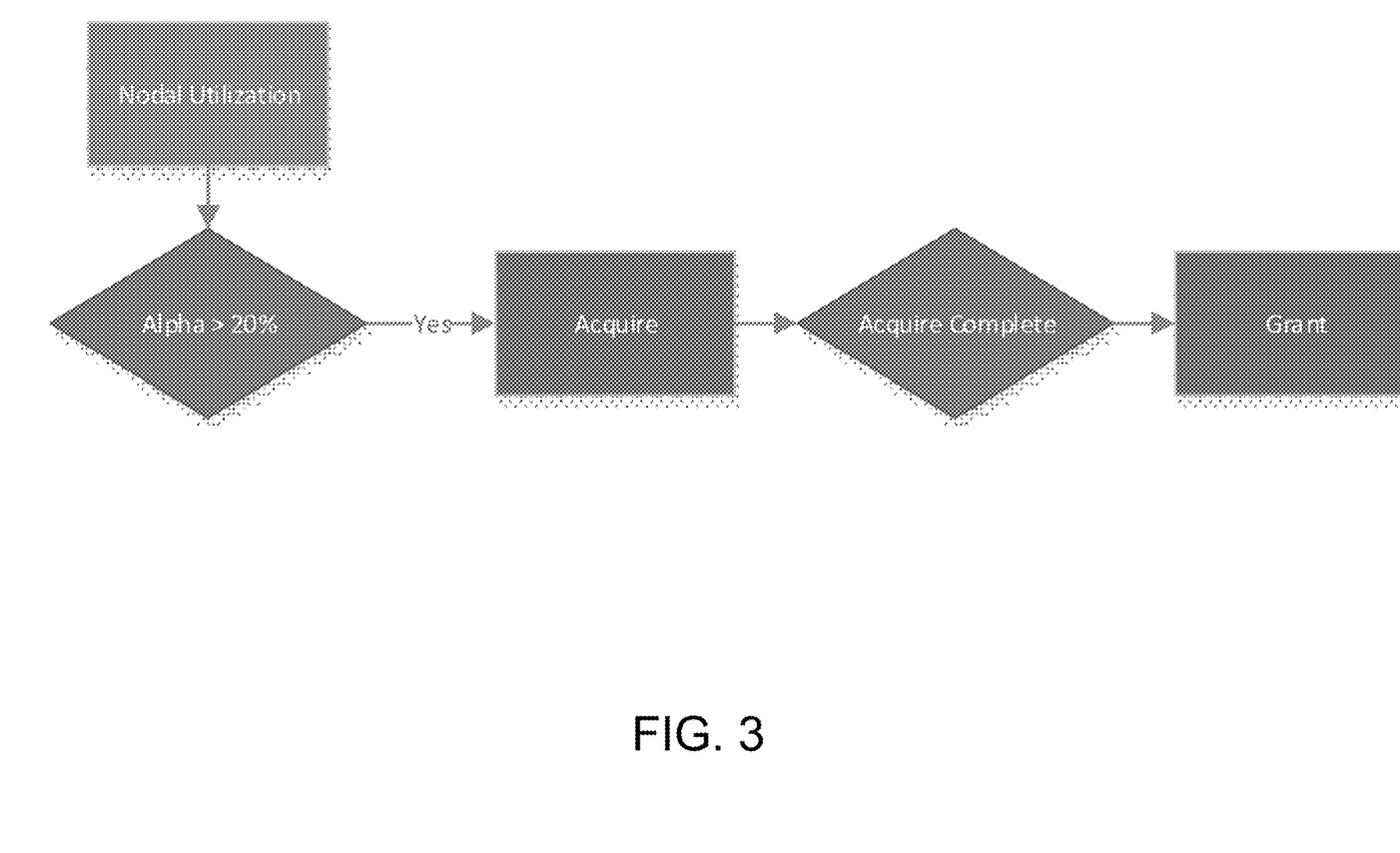
FIG. 3 is a flow diagram illustrating a method for rebalancing based on nodal utilization in accordance with an exemplary embodiment of the disclosed subject matter.
Figure 4:
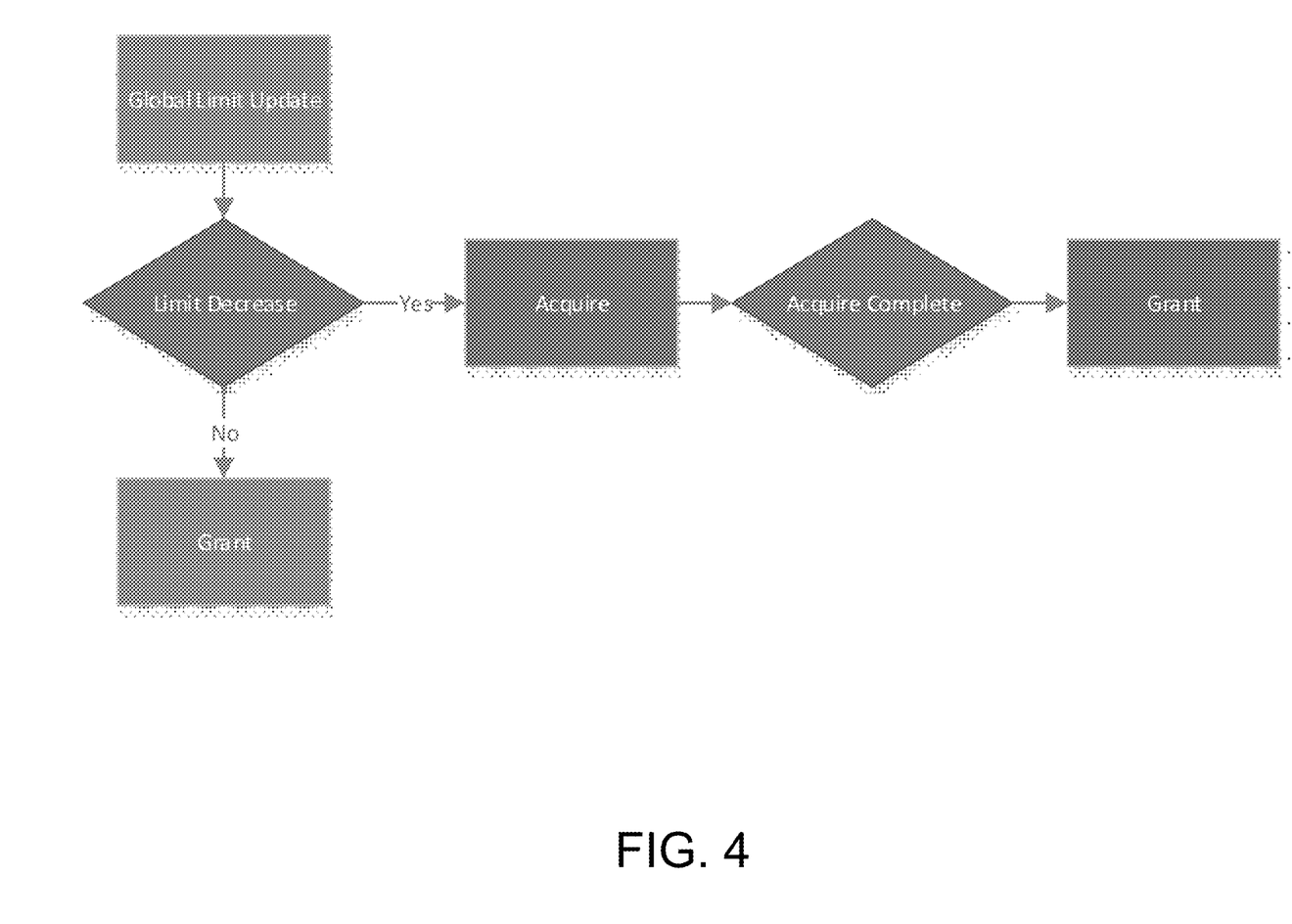
FIG. 4 is a flow diagram illustrating a method for rebalancing based on global limit updates in accordance with an exemplary embodiment of the disclosed subject matter.
Figure 5:
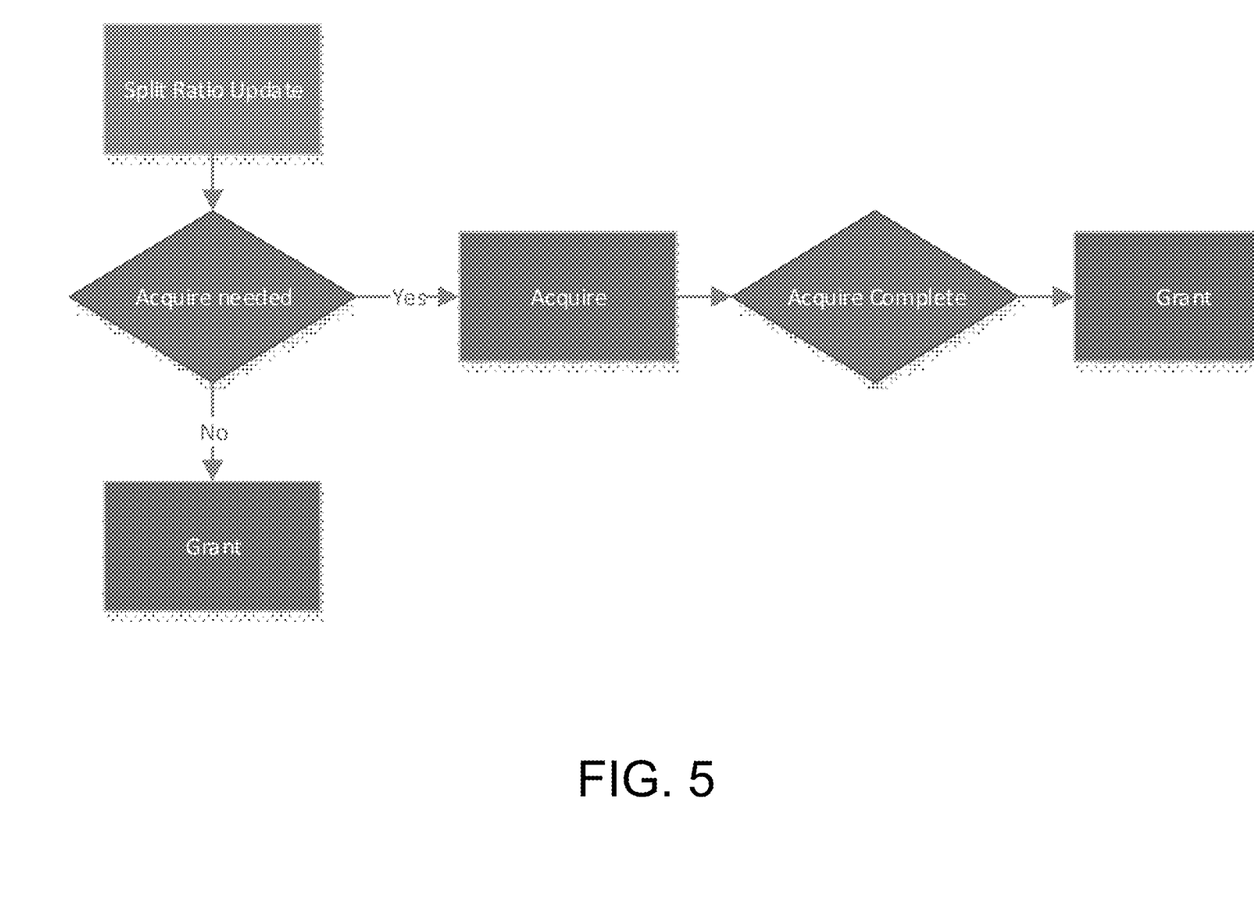
FIG. 5 is a flow diagram illustrating a method for rebalancing based on changes to the split ratio in accordance with an exemplary embodiment of the disclosed subject matter.

As embodied herein, for purpose of illustration and not limitation, the acquire or grant phases can be triggered by one or more of the following events: nodal parameter underutilization, as illustrated in FIG. 3; global limit parameter updates, as illustrated in FIG. 4; or split ratio update, as illustrated in FIG. 5.

For purpose of illustration, and not limitation, balancing in accordance with the disclosed subject matter can include arithmetic centered on the notion of "global unutilized limit" value, referred to herein as "global-free." As illustrated by the equations below, the global-free value can be the difference between the global value of a limit parameter and the sum of nodal utilization levels. For example, in a particular node, if the "total required margin" value was 1000 and the margin limit value was 1500, there would be 500 of margin that could still be used before breaching the limit.

$$free_{nodal}=limit_{nodal}-utilization_{nodal}$$

$$free_{global}=limit_{global}-\Sigma utilization_{nodal}$$

Each regional node's split ratio can be converted to a percentage of the global value that would optimally be distributed to that node, as illustrated by the equation below. The amount of global-free is what can be "distributed," so that each node has a local-free that is in proportion to its split ratio.

$$percentage_{node} = \frac{ratio_{node}}{\Sigma ratio_{node}}$$

For example in a three node system, with a split ratio of 1:2:2, the percentage of global for node 1 is 20%, and 40% for node 2 and 3.

Together, these values can produce a per-node out-of-balance equation, which produces a numeric value that would place the node back into ratio:

$$rebalance_{value}=free_{global}*percentage_{node}-free_{nodal}$$

This numerical value can reflect the difference between how much a node ought to have free and how much it actually has free.

The actual limit parameter sent to each region can be what the total limit should be for that region, to maintain its proportion of the global-free:

$$parameter_{new\ value}=free_{global}*percentage_{node}+utilization_{nodal}$$

For each parameter value that is lower than it was previously, a transaction can be issued to the given node setting it to the prescribed value (i.e., acquisition). When this has been affected and downloaded to the master node, separate events will grant values by recalculating rebalancing values for each node.

In the event that the global-free is negative, meaning a global limit breach, alpha checks can be skipped and transactions will be issued to ensure that all nodes are also in breach. For example, if one node becomes extremely over-breached due to a market event, the limits will be distributed so as to ensure trading is halted in all regions.

Before an acquire phase is triggered, a value can be calculated for each node that represents its utilization level. This calculation is referred to herein as the nodal "alpha":

$$alpha_{nodal} = \frac{\left(\frac{free_{nodal}}{free_{global}}\right)}{percentage_{node}}$$

The nodal alpha can reflect the ratio of nodal-free to global-free as it pertains to the nodal-ratio. When any alpha is a configurable distance from 100%, the system can allow acquisition to occur.

In this manner, a trading system in accordance with the disclosed subject matter can obviate the need for manual readjustment of local margin limits, minimize the potential for order rejection, reduce the use of system resources, and reduce complexity for the client.

In accordance with one aspect of the disclosed subject matter, the EMS of a particular trading node can be configured to hold an order if the local margin limit has been breached. For example, in the case where an order is rejected at a particular node because the account's local margin limit for that node has been breached, the account may have available margin limit in other nodes of the system. If the other nodes have sufficient availability, the order can be accepted. For example, the trading node can be configured to hold an order that might otherwise be rejected, evaluate limit availability across the global system, and determine if sufficient availability exists to allow the order.

In this manner, limit usage in a global geographically distributed trading system can be enhanced, eliminating the need for manual intervention or resubmission of orders and improving usability and time to market.

In accordance with one aspect of the disclosed subject matter, orders for a particular client can be sent concurrently to both an OMS and EMS of a particular trading node. For example, the OMS system can manage algorithmic order flow and the EMS system can manage DMA orders and child orders from the OMS for execution on the market. In connection with an exemplary embodiment, pre-trade risk checks for such orders can be performed in both the OMS and the EMS. For example, and not limitation, pre-trade risk checks can be performed at the OMS as described herein to allow for orders to be managed at the parent level. Additionally and/or alternatively, the EMS can perform pre-trade risk checks on the child orders and/or DMA orders.

In this manner, it is possible to send orders to both an OMS and EMS system concurrently where they are risk managed locally, such that limits are not breached in either system, while minimizing latency. This can allow for orders to be managed at the parent level while maintaining risk management for DMA orders.

For purpose of illustration, and not limitation, an example of the disclosed subject matter is described below.

In this example, all limit validation occurs locally in each trading hub (or regional node) of a multi-hub trading platform. Since limits are global (a client or account has a single limit that applies to all trading, regardless of trading hub) a mechanism in accordance with the disclosed subject matter is provided to manage global limits, referred to as "split and borrow."

Split and borrow includes dividing a global limit into local limits, so risk validation in each hub is against a share of the global limit. This can ensure that the global limit is not breached by trading in multiple hubs. In accordance with this example, the global limit is divided according to a pre-defined ratio, referred to as the Split Ratio, which is set per client and account. The Split Ratio is specified as an integer per hub. For example, in a three hub system comprising Chicago, London and Hong Kong, the Split Ratio may be specified as shown in the table below:

| Hub | Split Ratio |
| --- | --- |
| Chicago | 2 |
| London | 2 |
| Hong Kong | 1 |

That is, all global limits are divided in a 2:2:1 ratio across the respective hubs, i.e., Chicago is allocated 40% of the limit, London 40%, and Hong King 20%. The default Split Ratio is 1 across all trading hubs, i.e., the limit is allocated equally across hubs.

During the course of trading for a particular client or account, orders can be entered such that the utilization on each hub does not match the Split Ratio. In the case where a particular hub utilizes a greater proportion of its local limit as compared to other hubs, the system rebalances the local limits such that the remaining available balance is kept in proportion to the Split Ratio. Each local limit is adjusted as follows:

$$\text{Local Limit}_{new\ value} = \text{Available}_{global} * \text{Ratio}_{hub} + \text{Utilisation}_{hub}$$

The new local limit is equal to the local hub's ratio of total available balance (from the Split Ratio) plus what the local hub has already utilized. An example is shown in the table below for the Margin Limit, using the example Split Ratio above.

|  | Global | | Chicago | | London | | Hong Kong | |
| --- | --- | --- | --- | --- | --- | --- | --- | --- |
| Event | Global limit | Available | Local limit | Available | Local limit | Available | Local limit | Available |
| Set limit | 10000 | 10000 | 4000 | 4000 | 4000 | 4000 | 2000 | 2000 |
| Order entry 1 CH @1000 margin | 10000 | 9000 | 4000 | 3000 | 4000 | 4000 | 2000 | 2000 |
| Order entry 2 LO @500 margin | 10000 | 8500 | 4000 | 3000 | 4000 | 3500 | 2000 | 2000 |
| Order entry 3 CH @500 margin | 10000 | 8000 | 4000 | 2500 | 4000 | 3500 | 2000 | 2000 |
| Rebalance | 10000 | 8000 | 4700 | 3200 | 3700 | 3200 | 1600 | 1600 |

In the above example following entry of order 3, the Chicago hub is over-utilized compared to London and Hong Kong. The system performs a rebalance: the Chicago local limit is increased, and the London and Hong Kong local limits are decreased such that each local balance availability is in proportion to the Split Ratio.

Chicago local limit=8000*0.4+1500=4700.

London local limit=8000*0.4+500=3700.

Hong Kong local limit=8000*0.2+0=1600.

The local limit available balances are in proportion to the Split Ratio (3200:3200:1600=2:2:1).

As described above in connection with certain embodiments, certain components, such as trading nodes 102*a* and 102*b* and master node 101, can include a computer or computers, processor, network, mobile device, cluster, or other hardware to perform various functions. Moreover, certain elements of the disclosed subject matter can be embodied in computer readable code which can be stored on computer readable media and which when executed can cause a processor to perform certain functions described herein. In these embodiments, the computer and/or other hardware play a significant role in the systems and methods disclosed herein. For example, the presence of the computers, processors, memory, storage, and networking hardware provides the ability for users to trade on multiple trading platforms in different geographical regions, without regard to where they are located.

Additionally, as described above in connection with certain embodiments, certain components can communicate with certain other components, for example via a network, such as the internet. To the extent not expressly stated above, the disclosed subject matter is intended to encompass both sides of each transaction, including transmitting and receiving. One of ordinary skill in the art will readily understand that with regard to the features described above, if one component transmits, sends, or otherwise makes available to another component, the other component will receive or acquire, whether expressly stated or not.

Further, the presently disclosed subject matter is not to be limited in scope by the specific embodiments herein. Indeed, various modifications of the disclosed subject matter in addition to those described herein will become apparent to those skilled in the art from the foregoing description and the accompanying figures. Such modifications are intended to fall within the scope of the disclosed subject matter.

Although one or more embodiments have been described herein in some detail for clarity of understanding, it should be recognized that certain changes and modifications can be made without departing from the spirit of the disclosure. The embodiments described herein can employ various computer-implemented operations involving data stored in computer systems. Furthermore, the embodiments described herein employ various computer-implemented operations which can be adapted to be part of a computer system, the cloud, etc. For example, these operations can require physical manipulation of physical quantities—usually, though not necessarily, these quantities can take the form of electrical or magnetic signals, where they or representations of them are capable of being stored, transferred, combined, compared, or otherwise manipulated. Further, such manipulations are often referred to in terms, such as producing, yielding, identifying, determining, comparing, receiving, storing, calculating, or generating. Any operations described herein that form part of one or more embodiments of the disclosure can be useful machine operations. In addition, one or more embodiments of the disclosure also relate to a device or an apparatus for performing these operations. The apparatus can be specially constructed for specific required purposes, or it can be a general purpose computer selectively activated or configured by a computer program stored in the computer. In particular, various general purpose machines can be used with computer programs written in accordance with the teachings herein, or it can be more convenient to construct a more specialized apparatus to perform the required operations.

The embodiments described herein can be practiced with other computer system configurations including hand-held devices, microprocessor systems, microprocessor-based or programmable consumer electronics, minicomputers, mainframe computers, and the like.

As stated above, one or more embodiments of the present disclosure can be implemented as one or more computer programs or as one or more computer program modules embodied in one or more computer readable media. The term computer readable medium refers to any data storage device that can store data which can thereafter be input to a computer system—computer readable media can be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Disc), a CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications can be made within the scope of the claims. Accordingly, the described embodiments are to be considered as illustrative and not restrictive, and the scope of the claims is not to be limited to details given herein, but can be modified within the scope and equivalents of the claims. In the claims, elements do not imply any particular order of operation, unless explicitly stated in the claims.

Many variations, modifications, additions, and improvements can be made. Plural instances can be provided for components, operations or structures described herein as a single instance. Boundaries between various components, operations and data stores are somewhat arbitrary, and particular operations are illustrated in the context of specific illustrative configurations. Other allocations of functionality are envisioned and can fall within the scope of the disclosure(s). In general, structures and functionality presented as separate components in exemplary configurations can be implemented as a combined structure or component. Similarly, structures and functionality presented as a single component can be implemented as separate components. It will be apparent to those skilled in the art that various modifications and variations can be made in the method and system of the disclosed subject matter without departing from the spirit or scope of the disclosed subject matter. These and other variations, modifications, additions, and improvements can fall within the scope of the appended claim(s) and their equivalents.

What is claimed is:

1. A computerized trading system, comprising:
a master node and a plurality of regional nodes, the regional nodes each including a processor and memory, wherein the master node is communicatively coupled to each of the regional nodes over a network,
wherein the master node and regional nodes are programmed to perform a method for updating limits for each of the regional nodes, the method comprising:
maintaining, at the master node, a global limit and a ratio representing different proportions of the global limit allocable to each of the regional nodes, wherein the global limit is associated with a client account and set by the client, and wherein the ratio representing the different proportions of the global limit allocable to each of the regional nodes is predetermined;
allocating, by the master node to each of the regional nodes, a local limit that is a proportion of the global limit in accordance with the ratio;
monitoring, by the master node, local limit utilization at each of the regional nodes;
detecting, by the master node, one or more events, wherein the one or more events comprises a change in limit utilization at one or more of the regional nodes;
responsive to the detection of the one or more events, allocating a new local limit to one or more of the regional nodes;
determining, by the master node, a difference between an unutilized portion of the local limit allocated to one of the regional nodes and a proportion of an unutilized portion of the global limit, the proportion corresponding to the global limit allocable to the regional node; and
updating, by the master node, the local limit allocated to the regional node based on the determined difference.

2. The system of claim 1, wherein the one or more events detected by the master node further comprises the expiration of a predetermined time period during which the master node does not update any of the local limits of the regional nodes.

3. The system of claim 1, wherein the one or more events detected by the master node correspond to a change in the global limit, and wherein the method further comprises:
determining, by the master node, a proportion of the change in the global limit for each regional node; and
allocating, by the master node, a new limit to each of the regional nodes based on the determined proportions.

4. The system of claim 1, wherein the one or more events detected by the master node correspond to a change in the ratio, and wherein the method further comprises:
determining, by the master node, a new proportion of the global limit allocable to each regional node; and
allocating, by the master node, a new limit to each of the regional nodes based on the new proportion.

5. The system of claim 1, wherein global limit is one of a margin limit or a consideration limit.

6. The computerized trading system of claim 1, wherein the monitoring of the local limit utilization at each of the regional nodes by the master node is continuous.

7. A non-transitory computer-readable medium storing instructions that, when executed by one or more processors included in a master node and a plurality of regional nodes, cause the one or more processors to carry out a method of updating limits, the method comprising:
maintaining, at the master node, a global limit and a ratio representing different proportions of the global limit allocable to each of the regional nodes, wherein the global limit is associated with a client account and set by the client, and wherein the ratio representing the different proportions of the global limit allocable to each of the regional nodes is predetermined;
allocating, by the master node to each regional node, a local limit that is a proportion of the global limit in accordance with the ratio;
monitoring, by the master node, local limit utilization at each of the regional nodes;
detecting, by the master node, one or more events, wherein the one or more events comprises a change in limit utilization at one or more of the regional nodes;

responsive to the detection of the one or more events, allocating a new local limit to one or more of the regional nodes;

determining, by the master node, a difference between an unutilized portion of the local limit allocated to one of the regional nodes and a proportion of an unutilized portion of the global limit, the proportion corresponding to the global limit allocable to the regional node; and updating, by the master node, the local limit allocated to the regional node based on the determined difference.

8. The non-transitory computer-readable medium of claim 7, wherein the one or more events detected by the master node further comprises the expiration of a predetermined time period during which the master node does not update any of the local limits of the regional nodes.

9. The non-transitory computer-readable medium of claim 7, wherein the one or more events detected by the master node correspond to a change in the global limit, and wherein the method further comprises:

determining, by the master node, a proportion of the change in the global limit for each regional node; and allocating, by the master node, a new limit to each of the regional nodes based on the determined proportions.

10. The non-transitory computer-readable medium of claim 7, wherein the one or more events detected by the master node correspond to a change in the ratio, and wherein the method further comprises:

determining, by the master node, a new proportion of the global limit allocable to each regional node; and allocating, by the master node, a new limit to each of the regional nodes based on the new proportion.

11. The non-transitory computer-readable medium of claim 7, wherein global limit is one of a margin limit or a consideration limit.

12. The non-transitory computer-readable medium of claim 7, wherein the monitoring of the local limit utilization at each of the regional nodes by the master node is continuous.

13. A method of updating limits, the method comprising:

maintaining, at a master node, a global limit and a ratio representing different proportions of the global limit allocable to each of a plurality of regional nodes, the master node being communicatively coupled to the regional nodes over a network, wherein the global limit is associated with a client account and set by the client, and wherein the ratio representing the different proportions of the global limit allocable to each of the regional nodes is predetermined;

allocating, by the master node to each of the plurality of regional nodes, a local limit that is a proportion of the global limit in accordance with the ratio;

monitoring, by the master node, local limit utilization at each of the regional nodes;

detecting, by the master node, one or more events, wherein the one or more events detected by the master node comprise a change in limit utilization at one or more the regional nodes;

responsive to the detection of the one or more events, allocating a new local limit to one or more of the regional nodes;

determining, by the master node, a difference between an unutilized portion of the local limit allocated to one of the regional nodes and a proportion of an unutilized portion of the global limit, the proportion corresponding to the global limit allocable to the regional node; and updating, by the master node, the local limit allocated to the regional node based on the determined difference.

14. The method of claim 13, wherein the one or more events detected by the master node further comprises the expiration of a predetermined time period during which the master node does not update any of the local limits of the regional nodes.

15. The method of claim 13, wherein the one or more events detected by the master node correspond to a change in the global limit, and wherein the method further comprises:

determining, by the master node, a proportion of the change in the global limit for each regional node; and allocating, by the master node, a new limit to each of the regional nodes based on the determined proportions.

16. The method of claim 13, wherein the one or more events detected by the master node correspond to a change in the ratio, and wherein the method further comprises:

determining, by the master node, a new proportion of the global limit allocable to each regional node; and allocating, by the master node, a new limit to each of the regional nodes based on the new proportion.

17. The method of claim 13, wherein the monitoring of the local limit utilization at each of the regional nodes by the master node is continuous.

\* \* \* \* \*